(12) United States Patent
Vidal et al.

(10) Patent No.: US 12,344,459 B2
(45) Date of Patent: *Jul. 1, 2025

(54) COMPOSTABLE LID COMPRISING AN OXYGEN BARRIER LAYER FOR SEALING A CAPSULE AND CAPSULE SEALED BY THE LID

(71) Applicant: Ahlstrom Oyj, Helsinki (FI)

(72) Inventors: Florence Vidal, Saint Cyr au Mont D'or (FR); Mireille Roux, Givors (FR); Hervé Planchard, Crach (FR); Patrice Blanc, Saint Genis Laval (FR)

(73) Assignee: AHLSTROM OYJ, Helsinki (FI)

( * ) Notice: Subject to any disclaimer, the term of this patent is extended or adjusted under 35 U.S.C. 154(b) by 405 days.

This patent is subject to a terminal disclaimer.

(21) Appl. No.: 16/607,375

(22) PCT Filed: Apr. 27, 2018

(86) PCT No.: PCT/EP2018/060888
§ 371 (c)(1),
(2) Date: Oct. 23, 2019

(87) PCT Pub. No.: WO2018/197676
PCT Pub. Date: Nov. 1, 2018

(65) Prior Publication Data
US 2020/0140187 A1    May 7, 2020

(30) Foreign Application Priority Data

Apr. 28, 2017    (FR) ..................... 1753723

(51) Int. Cl.
*B65D 85/804*  (2006.01)
*B65D 65/46*  (2006.01)
*B29L 31/00*  (2006.01)

(52) U.S. Cl.
CPC ....... *B65D 85/8061* (2020.05); *B65D 65/466* (2013.01); *B65D 85/8052* (2020.05);
(Continued)

(58) Field of Classification Search
None
See application file for complete search history.

(56) References Cited

U.S. PATENT DOCUMENTS

| 2,832,522 A | 4/1958 | Schlanger |
| 5,219,646 A | 6/1993 | Gallagher et al. |

(Continued)

FOREIGN PATENT DOCUMENTS

| CN | 102181077 A | 9/2011 |
| CN | 103384486 A | 11/2013 |

(Continued)

OTHER PUBLICATIONS

Yam, Kit L. "The Wiley Encyclopedia of Packaging Technology." 3rd Edition 2009. p. 909 (Year: 2009).*

(Continued)

*Primary Examiner* — Viren A Thakur
(74) *Attorney, Agent, or Firm* — CANTOR COLBURN LLP

(57) ABSTRACT

A compostable lid for sealing a capsule containing coffee in particular, consisting of a multilayer article comprising at least: a non-woven, the fibers of which contain at least 50% by weight of biodegradable fibers, a support consisting of a vegetable parchment, at least one oxygen barrier layer.

18 Claims, 1 Drawing Sheet

(52) U.S. Cl.
CPC . *B29L 2031/7174* (2013.01); *B32B 2262/067* (2013.01); *B32B 2307/7163* (2013.01); *B32B 2307/7244* (2013.01)

(56) References Cited

U.S. PATENT DOCUMENTS

| | | | |
|---|---|---|---|
| 5,325,765 | A | 7/1994 | Sylvan et al. |
| 7,543,527 | B2 | 6/2009 | Schmed |
| 8,361,527 | B2 | 1/2013 | Winkler et al. |
| 8,956,672 | B2 | 2/2015 | Yoakim et al. |
| 2002/0127358 | A1* | 9/2002 | Berlin .................. B65D 65/466 428/36.6 |
| 2003/0003197 | A1* | 1/2003 | Berlin .................... B32B 27/10 426/106 |
| 2003/0217643 | A1* | 11/2003 | Masek ............... B65D 85/8043 99/279 |
| 2004/0052987 | A1* | 3/2004 | Shetty ...................... B65D 3/22 428/34.2 |
| 2004/0258893 | A1* | 12/2004 | Penttinen ................ B32B 27/32 428/212 |
| 2005/0084677 | A1 | 4/2005 | Domard et al. |
| 2005/0202743 | A1 | 9/2005 | Hausmann et al. |
| 2008/0083161 | A1* | 4/2008 | Shea .................. A01G 13/0268 47/9 |
| 2012/0070542 | A1* | 3/2012 | Camera .............. B65D 85/8043 426/77 |
| 2013/0071677 | A1* | 3/2013 | Penttinen .................. B32B 5/02 428/480 |
| 2014/0037916 | A1 | 2/2014 | Reilly et al. |
| 2014/0272018 | A1 | 9/2014 | Koller et al. |
| 2014/0370161 | A1 | 12/2014 | Abegglen et al. |
| 2015/0151508 | A1* | 6/2015 | Planchard ................ B32B 7/12 442/361 |
| 2015/0298438 | A1* | 10/2015 | Nevalainen ............. B29C 48/21 206/524.6 |
| 2015/0336736 | A1 | 11/2015 | Cabilli |
| 2016/0157515 | A1 | 6/2016 | Chapman et al. |
| 2017/0107034 | A1 | 4/2017 | Okamoto et al. |
| 2017/0320305 | A1 | 11/2017 | McMillan et al. |
| 2018/0148250 | A1* | 5/2018 | Schaude ............ B65D 85/8043 |
| 2019/0016528 | A1* | 1/2019 | Kuhl ....................... B29C 45/47 |
| 2020/0216256 | A1 | 7/2020 | Miozzo et al. |

FOREIGN PATENT DOCUMENTS

| | | |
|---|---|---|
| CN | 104854001 A | 8/2015 |
| CN | 105008249 A | 10/2015 |
| EP | 1344722 A1 | 3/2003 |
| EP | 1529739 A1 | 5/2005 |
| EP | 1659909 A1 | 5/2006 |
| EP | 2648579 A1 | 10/2013 |
| EP | 2690035 A1 | 1/2014 |
| FR | 2568515 A1 | 2/1986 |
| FR | 2991230 A1 | 12/2013 |
| JP | 5132056 A | 5/1993 |
| JP | 2003237826 A | 8/2003 |
| JP | 2004099053 A | 4/2004 |
| JP | 2012076231 A | 4/2012 |
| WO | 9429506 | 12/1994 |
| WO | 2011/015973 A1 | 2/2011 |
| WO | 2012077066 A1 | 6/2012 |
| WO | 2014/126463 A1 | 8/2014 |
| WO | 2014122385 A1 | 8/2014 |
| WO | 2015121489 A1 | 8/2015 |
| WO | WO-2015139140 A1 * | 9/2015 ......... B65D 85/8046 |
| WO | 2015170358 A2 | 11/2015 |
| WO | WO-2015177591 A2 * | 11/2015 ........... B65D 65/466 |
| WO | 2016139553 | 9/2016 |
| WO | WO-2016187724 A1 * | 12/2016 ......... B65D 85/8043 |
| WO | 2017017704 A1 | 2/2017 |

OTHER PUBLICATIONS

Mechelman—"Unique High Oxygen Barrier Coatings for Food Packaging." Oct. 10, 2016 Flexible Packaging Conference 2016. retrieved from: <http://docplayer.net/59668726-Unique-high-oxygen-barrier-coatings-for-food-packaging-flexible-packaging-conference-2016-october-10-2016.html> (Year: 2016).*
BIGG; "Polylactide Copolymers: Effect of Copolymer Ratio and End Capping on Their Properties"; Advances in Polymer Technology, vol. 24, No. 2; 2005; pp. 69-82.
International Search Report for International Application No. PCT/EP2018/060888; International Filing Date Apr. 27, 2018; Date of Mailing May 25, 2018; 4 pages.
International Search Report for International Application No. PCT/FI2017/050329; International Filing Date Apr. 28, 2017; Date of Mailing Jun. 21, 2017; 5 pages.
Lunt; "Large-scale production, properties and commerical applications of polylactic acid polymers"; Polymer Degradation and Stability, vol. 59; 1998; pp. 145-152.
Mayer; "Technical Intelligence—Vegetable Parchment—Papyrene"; The American Journal of Science and Arts, XXIX (LXXXVI): 278; May 1860.
Merriam-Webster Dictionary, "Definition of vegetable parchment", online access at https://www.merriam-webster.com/dictionary/vegetable%20parchment on Nov. 18, 2021.
Office Action for CN Application No. 201780025222.0 with Translation; Notification Date Mar. 20, 2020; 15 pages.
Office Action for CN Application No. 201780025222.0 with Translation; Notification Date Aug. 15, 2019; 24 pages.
Office Action for JP Application No. 2018556424 with Translation; Notification Date Oct. 25, 2020; 12 pages.
Reddy et al.; "Polylactic acid/polypropylene polyblend fibers for better resistance to degradation"; Polymer Degradation And Stability, vol. 93, No. 1; 2008; pp. 223-241.
Written Opinion for International Application No. PCT/EP2018/060888; International Filing Date Apr. 27, 2018; Date of Mailing May 25, 2018; 5 pages.
Written Opinion for International Application No. PCT/FI2017/050329; International Filing Date Apr. 28, 2017; Date of Mailing Jun. 21, 2017; 5 pages.

* cited by examiner

COMPOSTABLE LID COMPRISING AN OXYGEN BARRIER LAYER FOR SEALING A CAPSULE AND CAPSULE SEALED BY THE LID

PRIORITIES AND CROSS REFERENCES

This Application claims priority from International Application No. PCT/EP2018/060888 filed on 27 Apr. 2018 and French Application No. 1753723 filed on 28 Apr. 2017, the teachings of each of which are incorporated by reference herein in their entirety.

FIELD OF THE INVENTION

The invention relates to a lid, comprising an oxygen barrier layer, for sealing a capsule, in particular a coffee capsule. A capsule sealed by said lid is also subject matter of the invention. Finally, it relates to the use of this lid to seal a capsule containing a foodstuff, in particular ground coffee.

In the description that follows, the invention is described in relation to coffee capsules. Nevertheless, it can be applied to all domains in which the lid is likely to enclose food substances and must be an oxygen barrier, resistant to water, to pressure, to tearing and that can advantageously be thermosealed on a capsule or any other food container.

PRIOR ART

Two types of coffee pod are currently offered on the market, namely:
  flexible pods essentially comprised of a non-woven sachet containing the coffee,
  rigid pods or capsules comprised of a capsule that is strictly speaking closed by means of a lid.
The invention relates specifically to capsules.

Widely known on the European market are capsules of the Nespresso® type, of which the actual capsule part and the cover are essentially made of aluminum. There are also capsules of which the cover is produced from plastic material.

However, there is a high demand for the transformation of these non-compostable capsules into compostable capsules.

A few rare solutions have been proposed concerning the actual capsule part. Thus, capsules made of polylactic acid-based plastic (PLA) materials or so-called "PLA compatible" plastic materials have been developed. The so-called "PLA compatible" materials correspond to a mixture of PLA and vegetable fibers. They are biodegradable and compostable. Thus, these capsules comply with the compostability conditions imposed by the standard EN 13432.

On the other hand, it is all the more complicated to obtain a compostable lid as there are numerous constraints associated with the cover or lid. In fact, these capsules are likely to be used in coffee machines with pressure and temperature values to which they must be mechanically resistant.

Essentially, capsules are used in a coffee machine with individual pods or capsules according to the following process. Once the capsule is placed in its position, the bottom of the capsule is impacted. The holes that are formed make it possible to introduce water heated to a temperature of 96° C. into the body of the capsule at a pressure of between 10 and 12 bar. The water that fills the capsule progressively exerts pressure upon the lid which comes into contact with piercing elements, of the spike type, arranged in the machine. The pressure at the time of perforating the lid and during percolation is, most often, between 5 and 15 bar depending on the granulometry of the coffee. Once the lid is pierced in the form of the spikes, coffee flows into the cup. The manufacturers impose a certain number of conditions in terms of coffee flow. In particular, there must not be any powder in the cup. Moreover, a pod of approximately 30 ml must flow in approximately 30 seconds. Furthermore, the liquid that is flowing must have a color and a density resembling that of froth. There are also a certain number of constraints once the coffee has flowed, but when the capsule has not yet been ejected. In fact, in the hypothetical situation where the user only ejects the capsule some hours after the coffee has flowed, i.e. once the temperature of the capsule has returned to ambient temperature, the capsule must not be deformed. Otherwise, it will not fall into the receptacle provided for this purpose when a new capsule is introduced. The lid must not become delaminated either.

In other words, it is necessary to have a compostable lid which is resistant to humidity and to pressure such that it does not tear, either before or at the time of piercing. It is also necessary to provide a lid which does not allow the powder to pass through when the coffee is flowing.

Document FR 2 991 230 A1 describes a multilayer article combining a non-woven based on biodegradable polymers, an adhesive layer suitable for contact with food and a cellulose fiber-based support for the production of molds. The molds obtained in this way have the property of being resistant to the moisture coming from the food such that their edges do not collapse once it is placed in the mold. Of course, no pressure condition is mentioned because this is not a parameter that has to be taken into account for this application.

Application FR 16/53909 in the name of the Applicant describes a compostable lid for sealing a capsule containing coffee in particular, made from a multilayer article combining a non-woven based on polylactic acid fibers with a support made of vegetable parchment.

The problem that the invention proposes resolving is therefore how to devise a compostable lid for sealing a capsule, in particular a capsule containing coffee, which satisfies the conditions of use for this type of lid in coffee machines, in particular coffee machines with individual pods or capsules, in particular resistance to humidity, resistance to the pressure exerted by the mixture of powder and water of about 5 to 15 bar at the time of perforating the lid and during percolation, lack of delamination, the filter properties preventing the passage of coffee into the cup at the time of percolation, and which is, in addition, an oxygen barrier.

Another problem that the invention proposes resolving is also that of devising a lid which can be integrated into the current capsule production lines without any substantial modification of said lines.

DESCRIPTION OF THE INVENTION

In order to do this, the Applicant has devised a compostable article combining an advantageously PLA fiber-based non-woven, an oxygen barrier layer and a vegetable parchment support. The lid that is thus obtained is an oxygen barrier, resistant to the required pressure of between 5 and 15 bar, to humidity and which integrates easily into the existing capsule production lines.

Furthermore, the non-woven prevents the passage of powder through the lid at the time of the coffee flowing into the cup and the oxygen barrier limits the passage of oxygen to the coffee before using the capsule.

More precisely, the subject matter of the invention is a compostable lid for sealing a capsule containing coffee in particular, consisting of a multilayer article comprising at least:

- a non-woven containing fibers among which at least 50% by weight are biodegradable fibers,
- a support consisting of a vegetable parchment,
- at least one oxygen barrier layer.

In the description that follows and in the claims, a "compostable lid" designates a lid comprising a maximum of 5% by weight of total proportion of organic constituents without determined biodegradability (for example from binder or non-compostable fibers), thus complying with the standard EN 13432.

Likewise, "compostable capsule or capsule body" designates a capsule or capsule body comprising a maximum of 5% by weight of total proportion of organic constituents without determined biodegradability (for example from binder or non-compostable fibers), thus complying with the standard EN 13432.

As used herein, the term "biodegradable fiber" indicates that the fiber may be broken down into organic substances by living organisms, such as by microorganisms. Biodegradable fibers may include one or more of: polyhydroxyalkanoates (PHAs), including polylactic acid or polylactide (PLA) fibers, as well as fibers made of co-polymers of PLA and PHAs other than PLA; biodegradable polyethylene (PE); biodegradable polypropylene (PP); biodegradable polybutane (PB); starch-based polymers; cellulose-based polymers; ethylene vinyl alcohol (EVOH) polymers; other biodegradable polymers such as polybutanediolsuccinic acid (PBS); etc.

In a preferred embodiment, the non-woven containing biodegradable fibers described herein meets the compostability and biodegradability standards of EN 13432.

Advantageously, of the biodegradable fibers, at least 40% by weight are thermosealable fibers, advantageously polylactic acid (PLA) fibers.

In the description that follows and in the claims, the expression "thermosealable fibers" designates biodegradable fibers capable of ensuring sealing of the non-woven on the capsule by heating. These are advantageously PLA fibers which enable the thermosealing of the non-woven on a compatible PLA capsule.

Within the framework of the present invention, it is considered that a lid is satisfactory as regards oxygen barrier properties if the rate of transfer of oxygen through the lid is less than or equal to 1.5 cm3/m$^2$/day, measured according to the standards ASTM D 3985 and ASTM F 1927.

Likewise, it is considered that a lid is satisfactory as regards resistance to pressure if the lid does not tear when it is subjected to a pressure exerted by the mixture of powder and water of between 5 and 15 bar at the time of perforating the lid and during percolation. Before perforation, the lid must not tear due to the effect of the water pressure increasing in the capsule. After perforation, the holes resulting from the perforation must not tear, and so increase in size due to the effect of the pressure, so as on the one hand to not allow powder to escape, and on the other hand to retain in particular the froth characteristics of the coffee.

There are several types of coffee capsule and other capsules are currently being developed and others will be developed at a later stage. The lid according to the invention offers the advantage that it can be adapted easily to all types of capsule, whether known or still to emerge.

For example, one can cite the semi-rigid capsules in the form of a truncated cone described in U.S. Pat. Nos. 7,658, 141 and 7,153,530. One can also cite U.S. Pat. No. 8,956, 672 which discloses a capsule in the form of an inverted cup. Patent EP 2 690 035 discloses a capsule in the form of a truncated cone of which the base is perforated. Patent EP 2 648 579, on its part, describes a capsule in the form of a truncated cone of which the smallest base is concave as viewed from the exterior. One can also cite patents EP 1 344 722 and U.S. Pat. No. 7,543,527 which disclose a capsule which comprises in particular a distribution disc. One can cite document EP 1659909 A1 which describes a capsule comprising an integrated injection nozzle. One can also refer to capsules described in documents U.S. Pat. No. 8,361,527, EP 1529739 and U.S. Pat. No. 5,325,765.

According to a first feature, the lid of the invention contains a non-woven of which the fibers comprise at least 50% by weight of biodegradable fibers.

The biodegradable fibers are preferably chosen from the group comprising cellulose fibers such as cotton, linen, wood fibers or else PLA (polylactic acid), PHA (polyhydroxyalkanoate), PHB (poly(hydroxybutyrate)), PHB(V) (poly(hydroxybutyrate-co-hydroxyvalerate)), PBS (poly (butylene succinate)), biopolyester fibres.

Polylactic acid (PLA) offers the advantage of being in particular biosourced, biodegradable and compostable. "PLA" designates polylactic acid, its derivatives (L and D type or copolymers), and mixtures thereof. The PLA fibers advantageously have a diameter of between 10 and 15 micrometers.

Advantageously, at least 40% by weight of the biodegradable fibers are thermosealable fibers.

Preferably, the thermosealable fibers are chosen from the group comprising PLA, PHA (polyhydroxyalkanoate), PHB (poly(hydroxybutyrate)), PHB(V) (poly(hydroxybutyrate-co-hydroxyvalerate)), PBS (poly(butylene succinate)), biopolyesters.

The thermoseable fibers preferably have a melting point of at least 100° C., in practice between 100 and 250° C., preferably between 100 and 200° C.

In general, a non-woven is a material obtained by the random arrangement of individual fibers which are interlaced. The cohesion of the fibers to one another may be ensured by the addition of adhesive or binders (latex, polyvinyl alcohol, starch, etc.), by heating, by pressure, or by needling, for example. Numerous methods for preparing non-wovens form part of the knowledge of the person skilled in the art. They include, for example, meltblowing spinning processes, direct spinning or spin laying or spunbond processes, carding, air laying or—wet laying.

Apart from the fibers, the non-woven may also comprise additives and mineral fillers. The incorporation of additives, fillers or fibers other than those of PLA may make it possible to modulate the melting point of the base layer of PLA.

In practice, the fibers making up the non-woven include at least 20%, preferably at least 50%, advantageously at least 85%, more preferably at least 90% by weight of PLA fibers, the addition making it up to 100% being formed by biodegradable fibers, advantageously cellulose fibers. In addition to PLA fibers, the non-woven may include other biodegradable fibers, preferably cellulose fibers. In one preferred embodiment, the nonwoven is formed of fibers that are selected exclusively from biodegradable fibers. The non-woven is advantageously produced in this embodiment by—wet laying.

In one specific embodiment, 100% of the fibers of the non-woven are made up of thermosealable fibers, advantageously PLA fibers. In this case, the cohesion of the fibers, and so of the non-woven, is obtained in the absence of any adhesive or binder by a spunbond production process.

When it contains 100% by weight of PLA, the non-woven may be single-layered. Advantageously, this may be a bilayer non-woven. The bilayer may be monocomponent, i.e. containing just one type of PLA or bicomponent, i.e. containing 2 types of PLA that have different melting points.

According to another feature, the porosity of the non-woven measured according to the standard DIN 53.887 is between 3000 and 5000 $l/m^2/s$.

Finally, and in practice, the grammage of the non-woven is between 5 and 100 $g/m^2$, advantageously between 10 and 30 $g/m^2$, even more advantageously between 15 and 20 $g/m^2$, preferably about 18 $g/m^2$.

According to one essential feature of the invention, the support is made of a vegetable parchment, qualified in French as "veritable" ("genuine"). A detailed description of this is given in the work by Mayer, Ferdinand F (May 1860), "Technical Intelligence—Vegetable Parchment—Papyrene", The American Journal of Science and Arts, XXIX (LXXXVI): 278. Essentially, the vegetable parchment is a paper that is treated most of the time with sulfuric acid. More rarely, zinc chloride can be used. The fibers are cellulose fibers generally chosen from eucalyptus fibers and resinous fibers. In practice, sulfuric acid dissolves the cellulose around the fibers. A cellulose gel forms, which is then precipitated. In a final step, the support is rinsed. The treatment applied forms a cross-linked sulfurized sheet which has a high density, high stability, high resistance to heat and low surface energy which provide it with satisfactory anti-adhesive properties.

The support is not therefore a high density greaseproof paper nor a chemically treated greaseproof paper (for example treated with fluorinated resin). The support does not contain any resin either, thus giving mechanical strength in the wet state.

In order to improve its resistance to pressure, the vegetable parchment has a ratio of wet burst strength measured according to the standard ISO 3689/1994/dry-burst strength measured according to the standard ISO 2758: 2001 of between 50 and 70%, preferably between 55 and 65%.

In practice, the grammage of the vegetable parchment is between 30 and 120 $g/m^2$, advantageously between 70 and 110 $g/m^2$.

Likewise, its thickness is in practice between 60 and 130 micrometers.

According to another essential feature, the lid contains at least one oxygen barrier layer. The oxygen barrier makes it possible in particular to keep the coffee contained in the capsule for a longer period of time.

According to a first embodiment, the oxygen barrier layer is placed between the non-woven and the support. Thus, the lid contains successively, in the direction of the capsule, a support, an oxygen barrier layer and a non-woven.

According to a second embodiment, the non-woven is placed under the support and the oxygen barrier layer is placed above the support. Thus, the lid successively contains, in the direction of the capsule, an oxygen barrier layer, a support and a non-woven. Each of the barrier layers may itself be comprised of a number of layers.

According to a third embodiment, the lid according to the invention comprises two oxygen barrier layers.

In a first specific case, the 2 barrier layers are placed side by side and are advantageously placed between the non-woven and the support.

Thus, the lid contains successively, in the direction of the capsule, the support, two oxygen barrier layers and the non-woven.

In a second specific case, the 2 barrier layers are separated and are positioned on either side of the support. Thus, the lid successively contains, in the direction of the capsule, an oxygen barrier layer, a support, a second oxygen barrier layer and a non-woven.

According to another feature, the oxygen barrier layers may have different compositions.

In practice, the oxygen barrier layer is based on polyvinyl alcohol (PVA).

In a first embodiment, the barrier layer contains a mixture of polyvinyl alcohol with a polyamide epichlorohydrin-based resin. Preferably, the polyamide epichlorohydrin-based resin is kymene. In this case, the oxygen barrier layer contains between 80 and 95%, preferably between 85 and 90% by dry weight PVA, the addition making it up to 100% being comprised of the polyamide epichlorohydrin-based resin.

In a second embodiment, the oxygen barrier layer is based on polyvinyl alcohol of which the degree of hydrolysis is between 98 and 99%. As above, the barrier layer may furthermore contain a polyamide epichlorohydrin-based resin in identical proportions to those given above.

In a third embodiment, the oxygen barrier layer is based on highly amorphous polyvinyl alcohol. One example is Michem® Flex Barrier 3510 marketed by MICHELMAN.

In a fourth embodiment, the barrier layer is based on an ethylene vinyl alcohol copolymer (EVOH).

In practice, the total grammage of the oxygen barrier layer (i.e. when it is comprised of one or two layers, or even more) is between 0.5 $g/m^2$ and 8 $g/m^2$, advantageously from 2 to 5 $g/m^2$.

In practice, the oxygen barrier layer is applied to the support, by coating. When the support is treated with two barrier layers, it is successively coated with two distinct layers.

Advantageously, the lid further contains at least one adhesive layer, preferably suitable for contact with food.

According to the embodiments presented above, the adhesive layer is applied between the oxygen barrier layer and the non-woven or the support and the non-woven.

The adhesive makes it possible in particular to ensure the cohesion of the multilayer article when the latter is exposed to a temperature close to or greater than the melting temperature of the PLA during the thermosealing of the lid on the capsule. The adhesive also makes it possible to keep the sulfurized support or, if applicable, the sulfurized support article/oxygen barrier layer, on the layer of PLA welded to the capsule when the multilayer article is in contact with hot water during percolation, and then during the cooling.

The term "adhesive suitable for contact with food" designates any type of adhesive that is generally used in the agri-food industry. However, it may advantageously be chosen from the group including acrylic adhesives, polyurethane adhesives, ethylene vinyl acetates, and mixtures thereof.

In one preferred embodiment, the adhesive suitable for contact with food is chosen from the acrylic adhesives marketed by Lubrizol in the Carbobond® and Hycar® ranges, on their own or in a mixture.

The quantity of adhesive represents in practice between 1 and 5 $g/m^2$ when dry, advantageously between 2 and 4 $g/m^2$ when dry, preferably about 3 $g/m^2$ when dry relative to the surface of the multilayer article.

The oxygen barrier layer(s) and adhesive are applied such that the multilayer article comprises a maximum of 5% by weight of total proportion of organic constituents without determined biodegradability, thus complying with the standard EN 13432.

The thickness of the multilayer article which is subject matter of the invention is advantageously between 60 and 150, preferably between 90 and 110 micrometers.

According to another feature, the lid of the invention may be perforated.

The subject matter of the invention is also a capsule containing coffee in particular, comprising an actual capsule also designated the "capsule body" containing ground coffee and closed with the lid as described above, the lid being preferably positioned such that the non-woven is facing the rim of the capsule.

In practice, the capsule contains from 5 to 20 grams of ground coffee. The thickness of the bed of coffee is between 10 and 40 mm and the diameter of the capsule is between 2.5 and 6 cm.

In one preferred embodiment, the capsule body is made of PLA or of a PLA compatible material. This provides the advantage of being able to join the lid to the capsule body by sealing, thermosealing, gluing, etc. in so far as the materials are compatible (PLA or PLA compatible).

The capsule and/or capsule body is advantageously compostable according to the aforementioned standard EN 13432.

The full details of the test standard and the requirements for meeting the standard are described in NF EN 13432: 2000-11 "Requirements for packaging recoverable through composting and biodegradation" enclosed herein for reference.

In accordance with the standard, the compostable lid of the current invention and/or compostable capsule also preferably disintegrate in a biological waste treatment process, as specified by EN 13432, such that no more than 10% of the original dry weight of the test material fail to pass through a >2 mm fraction sleeve.

In a preferred embodiment, the compostable lid by itself is advantageously compostable according to the aforementioned standard EN 13432.

The capsule comprising the capsule body and the lid is preferably used in a coffee machine with pods or individual capsules.

The invention also relates to the use of the lid described above for sealing a capsule, in particular a coffee capsule, the lid being positioned such that the non-woven is facing the rim of the capsule.

The invention and the advantages resulting from it will become clearer from the figures and the following examples provided to illustrate the invention in a non-limiting manner.

EXEMPLARY EMBODIMENTS OF THE INVENTION

Examples of Structures According to the Invention

Figure 1:
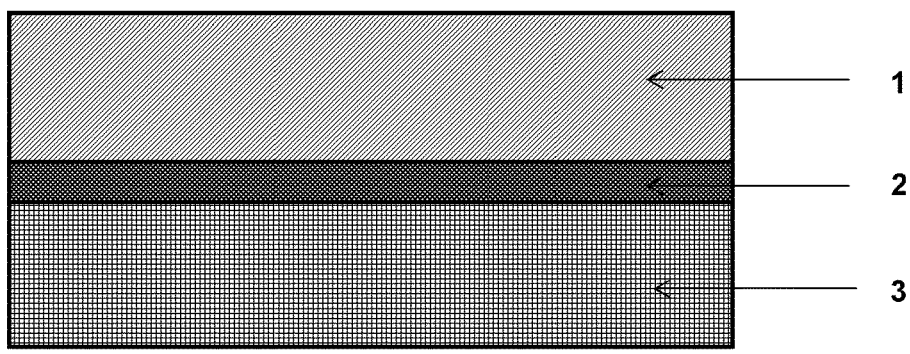
FIG. 1 illustrates a first embodiment of the lid which is the subject matter of the present invention.

FIG. 1 shows a lid in the form of a multilayer article, successively comprising:
- a support (1) made of vegetable parchment;
- an oxygen barrier layer (2);
- a non-woven (3) comprising 100% by weight of fibers made of PLA.

Figure 2:
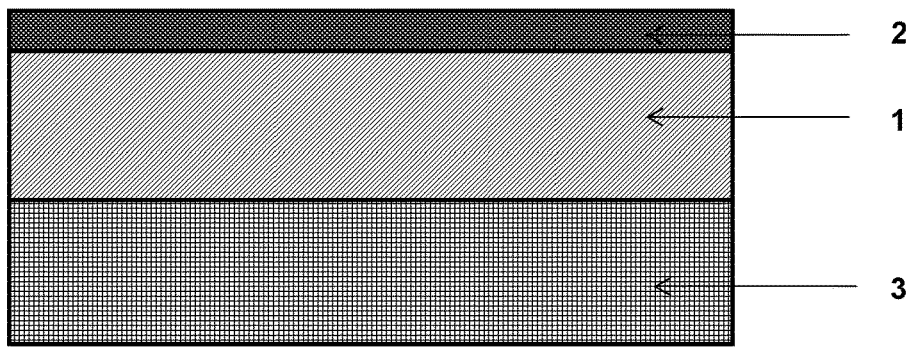
FIG. 2 illustrates a second embodiment of the lid which is the subject matter of the present invention.

In FIG. 2, the lid is in the form of a multilayer article, successively comprising:
- an oxygen barrier layer (2);
- a support (1);
- a non-woven (3).

Figure 3:
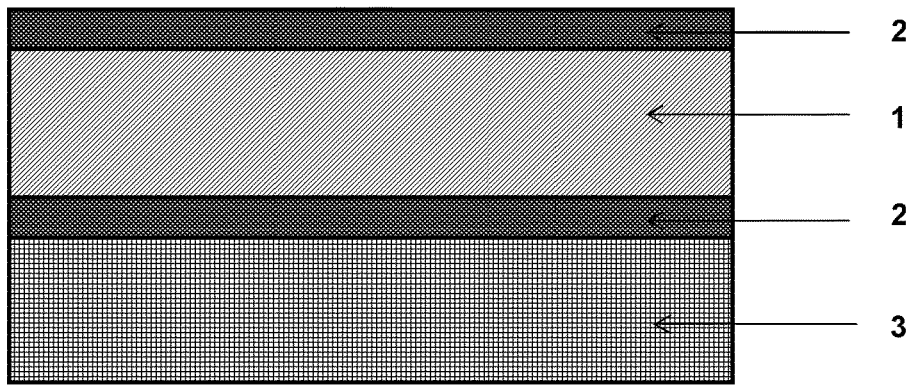
FIG. 3 illustrates a third embodiment of the lid which is the subject matter of the present invention.

In FIG. 3, the lid is in the form of a multilayer article, successively comprising:
- an oxygen barrier layer (2);
- a support (1);
- a second oxygen barrier layer (2);
- a non-woven (3).

Figure 4:
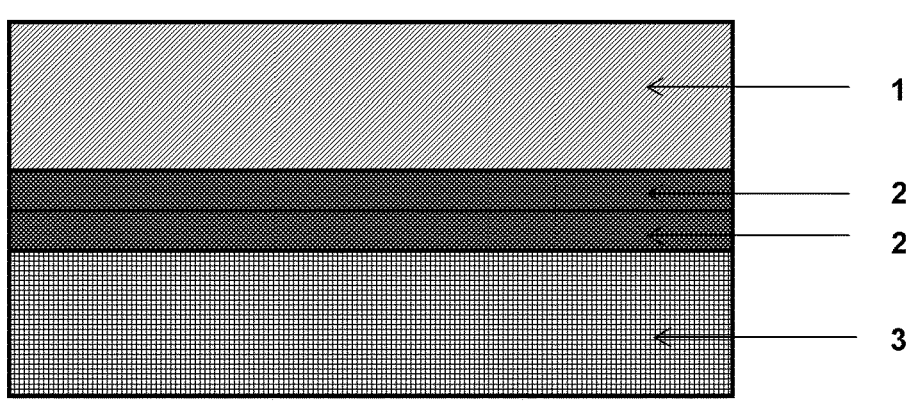
FIG. 4 illustrates a fourth embodiment of the lid which is the subject matter of the present invention.

In FIG. 4, the lid is in the form of a multilayer article, successively comprising:
- a support (1);
- an oxygen barrier layer (2);
- a second oxygen barrier layer (2);
- a non-woven (3).

Examples of the Lid According to the Invention

Examples 1 to 7 illustrate several configurations of lids according to the invention.

In all of the examples, the non-woven is a bilayer formed exclusively of PLA fibers. This is a monocomponent bilayer with a grammage of 18 $g/m^2$.

Likewise, in all of the examples, the non-woven is separated from the layer above it, i.e. from the oxygen barrier (FIG. 1, 3 or 4) or from the support by an adhesive layer (not shown) applied at a rate of up to 3 $g/m^2$ when dry. The adhesive is chosen from the acrylic adhesives marketed by Lubrizol in the Carbobond® and Hycar® ranges, on their own or in a mixture.

The support (1) is a vegetable parchment marketed by the applicant under the name "Sulflex®" with a grammage of either 70 $g/m^2$, or of 110 $g/m^2$.

3 types of oxygen barrier layer are tested:
- 100% by weight of an aqueous primary containing extremely amorphous PVA (HAVOH) at a rate of 2 $g/m^2$ when dry: marketed under the reference Michem® Flex Barrier 3510 by Michelman,
- 90% by dry weight of PVA and 10% of a polyamide epichlorohydrin-based resin (Kynnene®). The layer is applied at a rate of 2.5 $g/m^2$ when dry,
- 90% by dry weight of partially hydrolyzed PVA (Exceval®) and 10% of a polyamide epichlorohydrin-based resin (Kynnene®). The layer is applied at a rate of 2.5 $g/m^2$ when dry.

The oxygen barrier layer and the adhesive layer are applied such that examples 1-7 comprise a maximum of 5% by weight of total proportion of organic constituents without determined biodegradability.

The rate of transferring oxygen was measured at atmospheric pressure (1.013 bar) at a temperature of 23° C. with relative humidity of 50% according to the standards ASTM D 3985 and ASTM F 1927. The results obtained for Examples 1-7 are listed in the table shown below. All the examples, with oxygen barrier layer(s) showed satisfactory oxygen barrier performance with a rate of transfer of oxygen less than 1.5 cm3/m2/day.

| Example | Structure | Vegetable parchment grammage | Oxygen barrier | Rate of transfer of oxygen (cm3/m2 · day) |
|---|---|---|---|---|
| 1 | FIG. 3 | 70 | HAVOH at 2 g · m−2 | 0.47 |
| 2 | FIG. 4 | 70 | HAVOH at 2 g · m−2 | 1.10 |
| 3 | FIG. 3 | 70 | PVA and Kymene at 2.5 g · m−2 | 1.14 |
| 4 | FIG. 4 | 70 | PVA and Kymene at 2.5 g · m−2 | 0.97 |
| 5 | FIG. 1 | 110 | PVA and Kymene at 2.5 g · m−2 | 0.79 |
| 6 | FIG. 1 | 70 | Exceval and Kymene at 2.5 g · m−2 | 0.75 |
| 7 | FIG. 1 | 110 | Exceval and Kymene at 2.5 g · m−2 | 0.74 |

Without an oxygen barrier layer, the above samples showed a very high rate of transfer of oxygen and were unsatisfactory.

The resistance to the pressure of the lid is then checked. In order to do this, the capsule is placed in a Nespresso® Pixie machine, and the rise in pressure is followed for the whole duration of the percolation. The pressure is between 5 and 15 bar according to the granulometry of the coffee contained in the capsule. None of the lids tested tears due to the effect of the pressure.

The invention claimed is:

1. A compostable lid sealed to a coffee capsule, the compostable lid composed of a multilayer article comprising at least:
    a non-woven comprising fibers which contain at least 50% by weight of biodegradable fibers,
    a support comprising a vegetable parchment, wherein the vegetable parchment has a ratio of wet burst strength measured according to ISO Standard 3689/1994/dry burst strength measured according to ISO Standard 2758:201 of between 1:2 and 7:10,
    at least one oxygen barrier layer having a grammage between 0.5 g/m² and 8 g/m², and
    wherein the lid is sealed to a rim of a capsule body of the coffee capsule to seal the coffee capsule, with the non-woven facing the rim;
    wherein the grammage of the non-woven is between 5 and 100 g/m².

2. The compostable lid sealed to the coffee capsule according to claim 1, characterized in that at least 40% by weight of the biodegradable fibers are thermosealable fibers.

3. The compostable lid sealed to the coffee capsule according to claim 1, characterized in that the biodegradable fibers are chosen from the group consisting of cellulose fibers PLA (polylactic acid), PHA (polyhydroxyalkanoate), PHB (poly (hydroxybutyrate)), PHB (V) (poly (hydroxybutyrate-co-hydroxyvalerate)), PBS (poly (butylene succinate)), and biopolyester fibers.

4. The compostable lid sealed to the coffee capsule according to claim 2, characterized in that the thermosealable fibers are chosen from the group consisting of PLA (polylactic acid), PHA (polyhydroxyalkanoate), PHB (poly (hydroxybutyrate)), PHB (V) (poly (hydroxybutyrate-co-hydroxyvalerate)), PBS (poly (butylene succinate)), biopolyesters.

5. The compostable lid sealed to the coffee capsule according to claim 1, characterized in that the fibers constituting the non-woven comprises 100% by weight of biodegradable fibers, at least 50% by weight of the biodegradable fibers comprising PLA (polylactic acid) fibers.

6. The compostable lid sealed to the coffee capsule according to claim 1, characterized in that the fibers constituting the non-woven comprise 100% by weight of PLA (polylactic acid) fibers.

7. The compostable lid sealed to the coffee capsule according to claim 1, characterized in that the grammage of the vegetable parchment is between 30 and 120 g/m².

8. The compostable lid sealed to the coffee capsule according to claim 1, characterized in that said oxygen barrier layer is placed between said non-woven and said support.

9. The compostable lid sealed to the coffee capsule according to claim 1, characterized in that said non-woven is placed under said support and said oxygen barrier layer is placed above said support.

10. The compostable lid sealed to the coffee capsule according to claim 1, characterized in that the lid comprises two oxygen barrier layers.

11. The compostable lid sealed to the coffee capsule according to claim 1, characterized in that the two oxygen barrier layers are placed side by side and between said non-woven and said support.

12. The compostable lid sealed to the coffee capsule according to claim 1, characterized in that the two oxygen barrier layers are separated and are placed on either side of said support.

13. The compostable lid sealed to the coffee capsule according to claim 1, characterized in that said oxygen barrier layer is based on polyvinyl alcohol or comprises a mixture of polyvinyl alcohol with a polyamide epichlorohydrin-based resin.

14. The compostable lid sealed to the coffee capsule according to claim 1, characterized in that the compostable lid further comprises an adhesive layer applied between said oxygen barrier layer and said non-woven.

15. The compostable lid sealed to the coffee capsule according to claim 1, wherein the compostable lid sealed to the coffee capsule has a pressure resistance of between 5 and 15 bar.

16. The compostable lid sealed to the coffee capsule according to claim 1, characterized in that the coffee capsule contains from 5 to 20 grams of ground coffee, the ground coffee having a coffee bed thickness of between 10 and 40 mm and a diameter of the capsule of between 2.5 and 6 cm.

17. A method of forming the compostable lid sealed to the coffee capsule according to claim 1, the method comprising the step of:
    manufacturing the coffee capsule comprising the capsule body and the rim;
    manufacturing the compostable lid; and
    sealing the compostable lid to the coffee capsule at the rim.

18. A compostable lid sealed to a coffee capsule, the compostable lid composed of a multilayer article comprising at least:
    a non-woven comprising fibers which contain at least 50% by weight of biodegradable fibers, a support comprising a vegetable parchment, wherein the vegetable parchment has a ratio of wet burst strength measured according to ISO Standard 3689/1994/dry burst strength measured according to ISO Standard 2758:201 of between 1:2 and 7:10, at least one oxygen barrier layer having a grammage between 0.5 g/m² and 8 g/m², and wherein the compostable lid has a rate of transfer of oxygen less than 1.5 cm³/m²/day; and wherein the lid is sealed to a rim of a capsule body of the coffee capsule to seal the coffee capsule, with the non-woven facing the rim;

wherein the grammage of the non-woven is between 5 and 100 g/m²; and wherein the compostable lid sealed to the coffee capsule has a pressure resistance of between 5 and 15 bar.

* * * * *